United States Patent
Kawano et al.

(10) Patent No.: US 9,862,428 B2
(45) Date of Patent: Jan. 9, 2018

(54) STEEL MATERIAL AND IMPACT ABSORBING MEMBER

(71) Applicant: NIPPON STEEL & SUMITOMO METAL CORPORATION, Tokyo (JP)

(72) Inventors: Kaori Kawano, Tokyo (JP); Masahito Tasaka, Tokyo (JP); Yoshiaki Nakazawa, Tokyo (JP); Yasuaki Tanaka, Tokyo (JP); Toshiro Tomida, Tokyo (JP)

(73) Assignee: NIPPON STEEL & SUMITOMO METAL CORPORATION, Tokyo (JP)

(*) Notice: Subject to any disclaimer, the term of this patent is extended or adjusted under 35 U.S.C. 154(b) by 399 days.

(21) Appl. No.: 14/648,938

(22) PCT Filed: Dec. 6, 2012

(86) PCT No.: PCT/JP2012/081601
§ 371 (c)(1),
(2) Date: Jun. 2, 2015

(87) PCT Pub. No.: WO2014/087511
PCT Pub. Date: Jun. 12, 2014

(65) Prior Publication Data
US 2015/0344996 A1    Dec. 3, 2015

(51) Int. Cl.
| | | |
|---|---|---|
| *C22C 38/04* | (2006.01) | |
| *B62D 29/00* | (2006.01) | |
| *C22C 38/32* | (2006.01) | |
| *C22C 38/28* | (2006.01) | |
| *C22C 38/26* | (2006.01) | |
| *C22C 38/24* | (2006.01) | |
| *C22C 38/22* | (2006.01) | |
| *C22C 38/12* | (2006.01) | |
| *C22C 38/06* | (2006.01) | |
| *C22C 38/02* | (2006.01) | |
| *C22C 38/00* | (2006.01) | |
| *B62D 21/15* | (2006.01) | |
| *C22C 38/38* | (2006.01) | |

(52) U.S. Cl.
CPC .......... *B62D 29/007* (2013.01); *B62D 21/15* (2013.01); *C22C 38/001* (2013.01); *C22C 38/02* (2013.01); *C22C 38/04* (2013.01); *C22C 38/06* (2013.01); *C22C 38/12* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C21D 2211/002* (2013.01); *C21D 2211/008* (2013.01)

(58) Field of Classification Search
CPC ....................................................... C22C 38/04
See application file for complete search history.

(56) References Cited

FOREIGN PATENT DOCUMENTS

| | | |
|---|---|---|
| JP | 11-080879 | 3/1999 |
| JP | 11-269606 | 10/1999 |
| JP | 2000-017385 | 1/2000 |
| JP | 2001-220647 | 8/2001 |
| JP | 2004-084074 | 3/2004 |
| JP | 2004-277858 | 10/2004 |
| JP | 2006-161077 | 6/2006 |
| JP | 2008-189978 | 8/2008 |
| JP | 2009-167467 | 7/2009 |
| JP | 2011-140686 | 7/2011 |
| JP | 2012-001773 | 1/2012 |
| JP | 2012-214869 | 11/2012 |
| JP | 2012-255176 | 12/2012 |
| JP | 5605310 | 10/2014 |

OTHER PUBLICATIONS

English Machine Translation of JP 2012-214869 A of Futamura et al. (Nov. 8, 2012).*

* cited by examiner

*Primary Examiner* — Jessee Roe
*Assistant Examiner* — Jophy S Koshy
(74) *Attorney, Agent, or Firm* — Clark & Brody

(57) ABSTRACT

The steel material for an impact absorbing member has a composition containing: by mass %, C: 0.05 to 0.18%, Mn: 1 to 3%, Si+Al: at least 0.5% and less than 2.5%, and N: 0.001 to 0.015%, and in some cases, Cr: at most 0.5%, Mo: at most 0.2%, Ti: at most 0.05%, Nb: at most 0.05%, V: at most 0.2%, and B: at most 0.002%, the remainder being Fe and impurities. The steel material structure contains at least 70% by area of bainite made up of a lath structure having an average interval of at most 1 mm and martensite, 5 to 30%, and satisfies Formulas (1) and (2): (1) 1.2 ≤ $H_{M0}/H_{B0}$ ≤ 1.6, (2) 0.90 ≤ {$(H_{M10}/H_{M0})/(H_{B10}/H_{B0})$} ≤ 1.3, where $H_{M0}$ and $H_{M10}$ represent average nano hardness in an initial state and after 10% tensile deformation of the martensite, and $H_{B0}$ and $H_{B0}$ represent that of bainite, respectively.

7 Claims, 6 Drawing Sheets

STEEL MATERIAL AND IMPACT ABSORBING MEMBER

TECHNICAL FIELD

The present invention relates to a steel material and an impact absorbing member. Specifically, the present invention relates to an impact absorbing member in which occurrence of cracking when subjected to an impact load is suppressed and which has a high effective flow stress, and a steel material suitable as a starting material for the impact absorbing member.

BACKGROUND ART

In recent years, in order to protect global environment, weight reduction of automobile bodies is demanded as a measure to decrease the amount of $CO_2$ discharged from automobiles, and increases in the strength of steel materials for automobiles are required. This is because increase in the strength of steel material will allow decrease of the thickness of steel material for automobiles. On the other hand, there are increased demands for safety of automobiles in collisions. Accordingly, there is need for not only simply increasing the strength of steel material, but also developing a steel material having improved impact resistance upon collision during driving.

In such cases, since each portion of a steel material for an automobile is subjected to deformation at a high strain rate of at least several tens of seconds$^{-1}$ in collision, a high strength steel material having improved dynamic strength properties is required. As such a high strength steel material, there are known a low alloy TRIP steel having a high static-dynamic difference (difference between static strength and dynamic strength), and a high-strength multi-phase structure steel material such as a multi-phase structure steel having a second phase primarily including martensite.

Regarding the low-alloy TRIP steel, for example, Patent Document 1 discloses a strain induced transformation-type high-strength steel sheet (TRIP steel sheet) having improved dynamic deformation properties and for absorbing automobile collision energy.

On the other hand, regarding the multi-phase structure steel sheet having a second phase primarily including martensite, the followings are proposed.

Patent Document 2 discloses a high-strength steel sheet having improved balance of strength and ductility and a static-dynamic difference of at least 170 MPa, wherein the steel sheet is made up of fine ferrite grains, and the average grain diameter ds of nano crystal grains having a grain diameter of at most 1.2 μm and an average grain diameter dL of micro crystal grains having a grain diameter of more than 1.2 μm satisfy a relationship of dL/ds≥3.

Patent Document 3 discloses a steel sheet having a high static-dynamic ratio, wherein the steel sheet has a dual-phase structure of martensite having an average grain diameter of at most 3 μm and ferrite having an average grain diameter of at most 5 μm.

Patent Document 4 discloses a cold-rolled steel sheet having improved impact absorption properties, wherein the steel sheet contains at least 75% of ferrite phase having an average grain diameter of at most 3.5 μm, the remainder being tempered martensite.

Patent Document 5 discloses a cold-rolled steel sheet having a static-dynamic difference of at least 60 MPa at a strain rate of $5\times10^2$ to $5\times10^3$/s, wherein the steel sheet is made to have a dual-phase structure of ferrite and martensite by pre-straining.

Patent Document 6 discloses a high-strength hot-rolled steel sheet having improved impact resistant properties, wherein the steel sheet is made up only of at least 85% of bainite and a hard phase such as martensite.

CITATION LIST

Patent Document

Patent Document 1: Japanese Patent Laid-Open No. 11-80879
Patent Document 2: Japanese Patent Laid-Open No. 2006-161077
Patent Document 3: Japanese Patent Laid-Open No. 2004-84074
Patent Document 4: Japanese Patent Laid-Open No. 2004-277858
Patent Document 5: Japanese Patent Laid-Open No. 2000-17385
Patent Document 6: Japanese Patent Laid-Open No. 11-269606

SUMMARY OF INVENTION

However, a steel material which is a starting material for a conventional impact absorbing member has the following problem. That is, to improve impact absorbing properties of an impact absorbing member (hereafter, also referred to simply as a "member"), it is necessary to increase the strength of the steel material which is a starting material for the impact absorbing member (hereafter, also referred to simply as a "steel material").

As understood from the disclosure in Journal of Japan Society for Technology of Plasticity, vol. 46, No. 534, p. 641-645, which shows that an average load ($F_{ave}$) that determines the absorption of the impact energy of steel material is given as:

$$F_{ave} \propto (\sigma Y \cdot t^2)/4, \text{ where}$$

σY is effective flow stress, and
t is sheet thickness, the impact energy greatly depends on the thickness of steel material. Therefore, both a decreased thickness and a high impact absorbing capability for an impact absorbing member only by increasing the strength of steel sheet can be achieved only to some extent.

Further, as disclosed in, for example, International Publication Nos. 2005/010396, 2005/010397, and 2005/010398, the absorption of impact energy of an impact absorbing member also greatly depends on its shape. Therefore, there is possibility to rapidly increase the absorption of impact energy of the impact absorbing member to a level which cannot be achieved simply by increasing the strength of steel material, by optimizing the shape of the impact absorbing member so as to increase the plastic deformation work.

However, even if the shape of an impact absorbing member is optimized so as to increase the amount of plastic deformation work, crack would have occurred in the impact absorbing member in an early period before the desired plastic deformation is completed, unless the steel material has a deformation capability to be able to endure the amount of plastic deformation work. In such a case, it is not possible to increase the amount of plastic deformation work and therefore is not possible to rapidly increase the absorption of absorption of impact energy thereof. Moreover, if a crack occurs in the impact absorbing member in an early period, an unexpected situation may be brought in which another member disposed adjacent to this impact absorbing member is damaged.

Conventionally, the dynamic strength of steel material has been increased based on the technical concept that the absorption of impact energy of the impact absorbing member depends on the dynamic strength of steel material. However, simply increasing the dynamic strength of steel material may significantly deteriorate deformation properties. For that reason, even if the shape of the impact absorbing member is optimized so as to increase the amount of plastic deformation work, it is not necessarily possible to dramatically increase the impact energy absorbed by the impact absorbing member.

Further, since conventionally the shape of an impact absorbing member has been studied on the assumption that the steel material produced based on the above described technical concept is used, the optimization of the shape of the impact absorbing member has been studied from the beginning on the assumption of deformation capability of conventional steel sheets. For that reason, sufficient study has not been done from the perspective of improving the deformation capability of steel material so as to improve the amount of plastic deformation work as well as optimizing the shape of an impact absorbing member made of the obtained steel material.

As described above, to improve the absorption of impact energy of an impact absorbing member, it is important to optimize the shape of the impact absorbing member, in addition to increasing the strength of the steel material which is a starting material for the impact absorbing member so as to increase the amount of plastic deformation work.

Regarding the steel material of which is a starting material for an impact absorbing member, in order to optimize the shape of the impact absorbing member so as to increase the amount of plastic deformation work, it is important to increase an effective flow stress of the steel material while suppressing the occurrence of cracking when subjected to an impact load. Further, there is need for improving the robustness of the impact absorbing member such that even when the buckling direction of the impact absorbing member upon collision is different from the buckling direction assumed at the time of design thereof, cracking is suppressed and high absorption of impact energy is obtained.

In order to realize an impact absorbing member having high absorption of impact energy and excellent robustness, the present inventors have studied on steel materials which is a starting material for the impact absorbing member, regarding the means of suppressing the occurrence of cracking, increasing the robustness, and increasing effective flow stress when subjected to an impact load when the steel materials are formed into impact absorbing members, and thus have obtained new findings listed below.

(A) To improve the absorption of impact energy of an impact absorbing member, it is effective to increase an effective flow stress when a true strain of 5% is applied (hereafter, referred to as "5% flow stress") to the steel material.

(B) To suppress the occurrence of cracking in a member when subject to an impact load, it is effective to improve uniform elongation and local ductility of the steel material.

(C) To increase the robustness of a member relating to the suppression of cracking when subject to an impact load, it is effective to improve the local ductility of the steel material.

(D) To increase 5% flow stress of a steel material, it is effective to increase yield strength thereof and a work hardening coefficient (n value) in a low strain region.

(E) To increase the yield strength and the work hardening coefficient in a low strain region of a steel material, it is necessary that the steel structure of the steel material has a multi-phase structure containing bainite as the main phase, and martensite which is harder than bainite, in a second phase.

(F) The yield strength and local ductility of a multi-phase structure steel material having bainite as the main phase depend on the area fraction of bainite and the average interval of a lath structure (hereafter, also referred to as an "average lath interval") of bainite. Therefore, to obtain a high yield strength and a high local ductility in a multi-phase structure steel material having bainite as the main phase, it is necessary to specify a lower limit for the area fraction of bainite, in which an upper limit of the average lath interval is specified.

(G) Martensite contained in the second phase contributes to an increase of the work hardening coefficient in a low strain region and an increase in the uniform elongation. Therefore, it is necessary to specify a lower limit of the area fraction of martensite.

(H) On the other, excessive large area fraction of martensite will lead, to decrease of local ductility. Therefore, it is necessary to specify an upper limit for the area fraction of martensite.

(I) When a hardness ratio between bainite which is the main phase and martensite contained in the second phase is excessively large, mobile dislocations are more likely to be formed by plastic deformation, thereby decreasing the yield strength of the steel material. Therefore, it is necessary to specify an upper limit for the hardness ratio between bainite which is the main phase and martensite.

(J) On the other, excessive small hardness ratio between bainite which is the main phase and martensite contained in the second phase will make it difficult to increase the work hardening coefficient in a low strain region, which is obtained by including martensite, and increase the uniform elongation. Therefore, it is necessary to specify a lower limit of the hardness ratio between bainite which is the main phase and martensite.

(K) In a multi-phase structure steel material having bainite as the main phase, strain concentrates and work hardening occurs only in bainite by deformation it becomes likely that cracking occurs along a shear band and a grain boundary in bainite, thereby decreasing local ductility. On the other, when the second phase is excessively hardened by plastic deformation, since the hardness difference between the main phase and the second phase increases, it becomes more likely that cracking occurs from an interface therebetween, thereby decreasing local ductility as well. Therefore, to achieve high local ductility in a multi-phase structure steel material containing bainite as the main phase, it is necessary to cause strain to be appropriately distributed between bainite which is the main phase and the second phase. That is, it is necessary that bainite, which is the main phase, and the second phase are subject to a same level of work hardening when plastically deformed. As an index for this, it is preferable to use a proportion of work hardening rates after 10% tensile deformation. That is, in a multi-phase structure steel material containing bainite as the main phase and martensite in a second phase, it is necessary to specify lower and upper limits for the ratio between the work hardening rate of bainite after 10% tensile deformation and the work hardening rate of martensite after 10% tensile deformation.

The present invention, which is based on the above described new findings, is a steel material, comprising a chemical composition containing: by mass %, C: at least 0.05% and at most 0.18%, Mn: at least 1% and at most 3%, Si+Al: at least 0.5% and less than 2.5%, and N: at least 0.001% and at most 0.015%, and further, in some cases, one or two selected from Cr: at most 0.5% and Mo: at most 0.2%, one or more selected from Ti: at most 0.05%, Nb: at most 0.05%, and V: at most 0.2%, and B: at most 0.002%, the remainder being Fe and impurities; and a steel structure containing: by area %, bainite made up of a lath structure having an average interval of at most 1 µm: at least 70%, and martensite: at least 5% and at most 30%, the steel structure satisfying the following Formulas (1) and (2):

$$1.2 \leq H_{M0}/H_{B0} \leq 1.6 \quad (1)$$

$$0.90 \leq \{(H_{M10}/H_{M0})/(H_{B10}/H_{B0})\} \leq 1.3 \quad (2)$$

where, $H_{M0}$ represents initial average nano hardness of the martensite, $H_{B0}$ represents initial average nano hardness of the bainite, $H_{M10}$ represents average nano hardness of the martensite after 10% tensile deformation, and $H_{B10}$ represents average nano hardness of the bainite after 10% tensile deformation.

In another aspect, the present invention is an impact absorbing member including an impact absorbing portion, which absorbs impact energy by being axially crashed and buckled, wherein the impact absorbing portion is made of any of the above described steel material.

In a further aspect, the present invention is an impact absorbing member including an impact absorbing portion, which absorbs impact energy by being crashed in bending and buckled, wherein the impact absorbing portion is made of any of the above described steel material.

The steel material according to the present invention is suitable as a starting material for an impact absorbing portion in an impact absorbing member, the impact absorbing portion absorbing impact energy by being axially crashed and buckled, and especially in an impact absorbing member for an automobile. Such an impact absorbing member for an automobile is exemplified by a crash box (which is mounted onto a body shell such as a side member while supporting a bumper reinforcement, and is configured to be axially crashed and plastically deformed into a bellows shape by an impact load applied from the bumper reinforcement) having a tubular main body with a closed section. Other examples include a side member, a front upper rail, a side sill, a cross member, and the like.

Since the steel material according to the present invention has excellent robustness, it also has improved impact absorption capability against impact other than in axial direction. Therefore, the present steel material is also suitable as a starting material for an impact absorbing portion in an impact absorbing member, the impact absorbing portion absorbing impact energy by being crashed in bending and buckled, and may be used as a starting material for a center pillar, and the like.

The present invention can provide an impact absorbing member which can suppress or eliminate the occurrence of cracking when subjected to an impact load. Further, since an impact absorbing member exhibiting a high effective flow stress can be obtained, it becomes possible to dramatically improve the absorption of impact energy of the impact absorbing member. Applying such an impact absorbing member will allow further improvement of the collision safety of a product (for example, an automobile).

DESCRIPTION OF EMBODIMENTS

Figure 1:
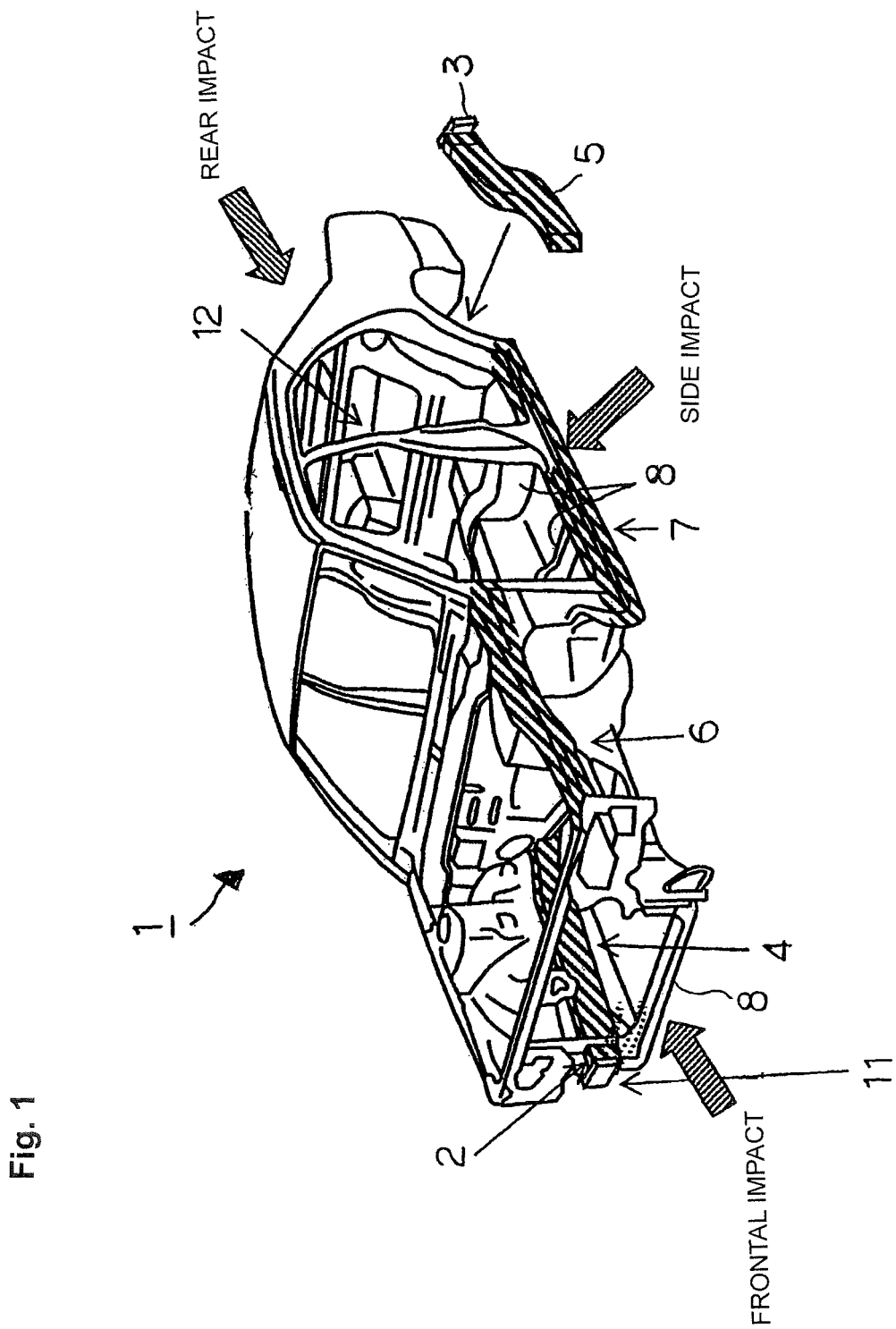
FIG. 1 is an explanatory diagram to show an example of regions where an impact absorbing member is applied in an automobile body.

Hereafter, the present invention will be described more specifically. In the following description, symbol "%" relating to the chemical composition of steel stands for, unless otherwise stated, "mass %".

1. Steel Structure (1) Multi Phase Structure and Main Phase

The steel structure of the steel material according to the present invention is configured to be a multi-phase structure, containing, as a main phase, bainite made up of a lath structure having an average interval of at most 1 µm, and martensite in a second phase, to improve effective flow stress by increasing yield strength and a work hardening coefficient in a low strain region. The second phase is a general term of phases other than the main phase.

Although the second phase may unavoidably contain, bainite made up of a lath structure having an average interval of more than 1 µm, austenite, ferrite, cementite, and pearlite, in addition to martensite, these phases are tolerated provided that their area fractions are each at most 5 area %.

The area fraction of bainite, which is the main phase and is made up of a lath structure having an average interval of at most 1 µm, is at least 70%.

In a multi-phase structure steel material having bainite as the main phase, the area fraction and the average lath interval of the bainite affect the yield strength and the local ductility of the steel material. That is, by increasing the area fraction of bainite and refining the lath structure of bainite, the yield strength of steel material and its local ductility typified by hole expansion formability and bendability are improved. When the area fraction of bainite made up of a lath structure having an average interval of at most 1 µm is less than 70%, it becomes difficult to obtain an impact absorbing member having excellent impact absorption capability due to deficiency of yield strength and local ductility. Therefore, the area fraction of bainite made up of a lath structure having an average interval of at most 1 µm is at least 70%. This area fraction is preferably at least 75%. Since finer interval of bainite is more preferable, there is no particular need of specifying a lower limit of the average lath interval of bainite. However, in the case of a chemical composition that C content is at most 0.18%, there is a limit in refining the lath, and the average lath interval of bainite is typically at least 0.2 μM.

The average lath interval of bainite is determined from an average interval of a lath interface by assuming that an interface having an orientation difference of at least 5 degree is a lath interface, and by observing a thickness section in parallel with the rolling direction of steel material by using an EBSD (Electron Back Scatter Diffraction) associated with FE-SEM (Field-emission type scanning electron microscope) after polishing it with emery paper and alumina powder, and further subjecting it to electrolytic polishing. The observation of the section is performed on a portion at a depth of ¼ thickness in the thickness direction from the surface of the steel material.

(2) Martensite Area Fraction

In a multi-phase structure steel sheet having bainite as the main phase, martensite has the function of increasing 5% flow stress thereof by increasing the yield strength and the work hardening rate in a low strain region of the steel material. Moreover, it also has the function of improving the uniform elongation of steel material. When the area fraction of martensite is less than 5%, it becomes difficult to obtain an impact absorbing member having excellent impact absorption capability due to deficiencies of 5% flow stress and uniform elongation. Therefore, the area fraction of martensite is at least 5%. The area fraction of martensite is preferably at least 10%, and is more preferably at least 15%. On the other hand, when the area fraction of martensite is more than 30%, the local ductility of steel material decreases so that cracking due to unstable buckling becomes likely to occur. Therefore, the area fraction of martensite is at most 30%. It is more preferably at most 25%.

(3) Initial Nano Hardness Ratio

The ratio ($H_{M0}/H_{B0}$) of initial average nano hardness of bainite which is the main phase and initial average nano hardness of martensite contained in the second phase is $1.2 \leq H_{M0}/H_{B0} \leq 1.6$ as shown in Formula (1) described above.

When the hardness ratio ($H_{M0}/H_{B0}$) is less than 1.2, it becomes difficult to achieve increases in the work hardening coefficient in a low strain region and the uniform elongation by including martensite, and cracking becomes more likely to occur. Therefore, the above described hardness ratio ($H_{M0}/H_{B0}$) is at least 1.2, and preferably at least 1.25.

On the other hand, when the above described hardness ratio ($H_{M0}/H_{B0}$) is more than 1.6, since the hardness ratio between the bainite main phase and the hard second phase is large, mobile dislocations become more likely to be formed by plastic deformation, thereby decreasing the yield strength of steel material. As a result of that, the absorption of impact energy decreases, making it difficult to obtain an impact absorbing member having excellent impact absorption capability. Therefore, the above described hardness ratio ($H_{M0}/H_{B0}$) is at most 1.6, and preferably at most 1.55.

(4) Work Hardening Rate Ratio

The ratio $\{(H_{M10}/H_{M0})/(H_{B10}/H_{B0})\}$ of work hardening rate between bainite which is the main phase and martensite contained in the second phase is $0.9 \leq \{(H_{M10}/H_{M0})/(H_{B10}/H_{B0})\} \leq 1.3$ as shown in Formula (2) shown above.

In the multi-phase structure steel material having bainite as the main phase, when the concentration of strain and work hardening occurs in bainite alone due to plastic deformation, it becomes likely that cracking occurs along a shear band and a grain boundary in bainite, thereby decreasing the local ductility of steel material. On the other hand, when the second phase is excessively hardened by plastic deformation as well, since the hardness difference between the main phase and the second phase increases, it also becomes likely that cracking occurs from an interface between the two phases, thereby decreasing local ductility. Therefore, to achieve high local ductility in a multi-phase structure steel material having bainite as the main phase, it is necessary to cause strain to be appropriately distributed between bainite which is the main phase and the second phase. That is, it is necessary that bainite which is the main phase and the second phase are subjected to a same level of work hardening when plastically deformed. As an index for this, it is preferable to use a ratio of work hardening rates after 10% tensile deformation. That is, in a multi-phase structure steel material containing bainite as the main phase and martensite in a second phase, it is necessary to specify a lower and upper limits for the ratio between the work hardening rate of the work hardening rate of martensite, which is the hardest phase, after 10% tensile deformation with respect to bainite after 10% tensile deformation.

To be specific, an upper and lower limits are specified for a work hardening rate ratio $\{(H_{M10}/H_{M0})/(H_{B10}/H_{B0})\}$ which is the ratio between a work hardening rate ($H_{B10}/H_{B0}$) of bainite determined from an initial average nano hardness ($H_{B0}$) of bainite and an average nano hardness ($H_{B10}$) of bainite after 10% tensile deformation, and a work hardening rate ($H_{M10}/H_{M0}$) of martensite determined from an initial average nano hardness ($H_{M0}$) of martensite and an average nano hardness ($H_{M10}$) of martensite after 10% tensile deformation.

When the above described work hardening rate ratio is less than 0.90, the concentration of strain occurs only in bainite due to plastic deformation. As a result of that, when work hardening occurs in steel material, it becomes more likely that cracking occurs along a shear band and a grain boundary in bainite, thus decreasing the local ductility of the steel material. Therefore, the above described work hardening rate ratio is at least 0.90, and preferably at least 0.95. On the other hand, when the above described work hardening rate ratio is more than 1.3, martensite will be excessively hardened, thereby decreasing the local ductility of the steel material. Therefore, the above described work hardening rate ratio is at most 1.3, and preferably at most 1.25.

2. Chemical Composition (1) C: at least 0.05% and at most 0.18%

C (carbon) has the function of promoting the formation of bainite which is the main phase, and martensite which is contained in a second phase. C also has the function of increasing the strength of martensite, and thereby improving the tensile strength of steel material, and the function of strengthening steel through solid solution strengthening, and thereby improving the yield strength and tensile strength of steel material.

However, when C content is less than 0.05%, there may be cases where it is difficult to achieve effects of the above described functions. Therefore, C content is at least 0.05%, and preferably at least 0.08%. On the other hand, when C content exceeds 0.18%, there may be cases where martensite and austenite are excessively formed, thereby causing a significant decrease in local ductility. Therefore, C content is at most 0.18%, and preferably at most 0.15%.

(2) Mn: At Least 1% and at Most 3%

Mn (manganese) has the function of promoting the formation of bainite which is the main phase and martensite which is contained in a second phase. Moreover, Mn also has the function of strengthening steel through solid solution strengthening, and thereby improving the yield strength and tensile strength of steel material. Further, since Mn improves the strength of bainite through solid solution strengthening, it has the function of improving the hardness of bainite under a high strain load condition, and thereby improving the local ductility of steel material.

When Mn content is less than 1%, there may be cases where it is difficult to achieve effects of the above described functions. Therefore, Mn content is at least 1%, and preferably at least 1.5%. On the other hand, when Mn content is more than 3%, there may be cases where martensite is excessively formed, thereby causing a significant decrease in local ductility. Therefore, Mn content is at most 3%, and preferably at most 2.5%.

(3) Si+Al: At Least 0.5% and Less than 2.5%

Si and Al have the function of suppressing the formation of carbides in bainite, thereby improving the uniform ductility and local ductility of steel material.

Moreover, they have the function of strengthening steel through solid solution strengthening, thereby improving the yield strength and tensile strength of steel material. Further, since they increase the strength of bainite is improved by solid solution strengthening, they have the function of improving the hardness of bainite under a high strain load condition, thereby improving the local ductility of steel material.

When the total content of Si and Al (herein also referred to as "Si+Al" content) is less than 0.5%, it is difficult to achieve effects of the above described functions. Therefore, (Si+Al) content is at least 0.5%, and preferably at least 0.7%. On the other hand, even when (Si+Al) content is at least 2.5%, the effects of the above described functions reach a limit, which is disadvantageous in respect of cost. Therefore, (Si+Al) content is less than 2.5%, and preferably less than 2.0%.

(4) N: At Least 0.001% and at Most 0.015%

N (nitrogen) has the function of strengthening steel through solid solution strengthening, and thereby improving the yield strength and tensile strength of steel material. Moreover, since N increases the strength of bainite through solid solution strengthening, it has the function of improving the hardness of bainite under a high strain load condition, thereby improving the local ductility of steel material. Further, when Ti or Nb is contained, N has the function of suppressing the grain growth of austenite by forming nitrides in steel and refining the packet of bainite, thereby improving the yield strength and tensile strength of steel material.

When N content is less than 0.001%, it becomes difficult to obtain effects of the above described functions. Therefore, N content is at least 0.001%, and preferably at least 0.002%. On the other hand, when N content is more than 0.015%, there are cases where coarse nitrides is produced in steel and uniform ductility and local ductility significant decrease. Therefore, N content is at most 0.015%, preferably at most 0.010%, and further preferably at most 0.005%.

Elements to be described below are optional additive elements which may be, in some cases, contained in the steel material according to the present invention.

(5) One or Two Kinds Selected from Cr: At Most 0.5%, and Mo: At Most 0.2%

Cr and Mo have the function of improving the hardenability, thereby promoting the formation of bainite. They also have the function of promoting the formation of a hard second phase typified by martensite. Further, they have the function of strengthening steel through solid solution strengthening, thereby improving the yield strength and the tensile strength of steel material. Therefore, one or two selected from Cr and Mo may be contained.

However, when Cr content exceeds 0.5%, or Mo content exceeds 0.2%, there may be a case where the uniform elongation and the local ductility are significantly deteriorated. Therefore, it is specified such that Cr content is at most 0.5% and Mo content is at most 0.2%. Further, to achieve effects of the above described functions more surely, it is preferable that any one of Cr: at least 0.1% and Mo: at least 0.1% is satisfied.

(6) One or More Selected from Ti: At Most 0.05%, Nb: At Most 0.05%, and V: At Most 0.2%

Ti, Nb and V have the function of suppressing the grain growth of austenite by forming carbonitrides in steel, and thereby reducing cracking sensitivity. Moreover, they also have the function of precipitating into bainite, and thereby improving the yield strength of steel material by the effect of precipitation strengthening. Therefore, one or more of Ti, Nb, and V may be contained.

However, when Ti content exceeds 0.05%, or Nb content exceeds 0.05%, or V content exceeds 0.2%, there may be a case where the local ductility is significantly deteriorated. Further, regarding Ti, there may be a case where its nitrides formed in steel becomes coarse, thereby leading to a significant deterioration in uniform ductility and local ductility. Therefore, it is specified such that Ti content and Nb content are at most 0.05%, respectively, and V content is at most 0.2%. Moreover, to achieve effects of the above described functions more surely, it is preferable that any of Ti, Nb, and V is contained at least 0.002%.

(7) B: At Most 0.002%

B (boron) has the function of improving hardenability of steel material, and thereby promoting the formation of bainite structure. Therefore, B may be contained. However, when B content exceeds 0.002%, there may be a case where the hardness of martensite excessively increases, thereby adversely affecting the local ductility of steel material. Therefore, B content is at most 0.002%. Moreover, to achieve effects of the above described functions more surely, B content is preferably at least 0.0001%, more preferably at least 0.0003%, and further preferably at least 0.001%.

3. Applications

The above described steel material according to the present invention is preferably applied to an impact absorbing portion in an impact absorbing member, in which the impact absorbing portion absorbs impact energy by being axially crashed and buckled.

Employing the above described steel material according to the present invention as the above described impact absorbing portion can suppress or eliminate the occurrence of cracking of the impact absorbing member when subjected to an impact load. In addition, since the effective flow stress of the steel material is high, it becomes possible to dramatically improve the absorption of impact energy of the above described impact absorbing member.

FIG. 1 is an explanatory diagram to show an example of portion to which an impact absorbing member is applied in an automobile body 1. An impact absorbing member having an impact absorbing portion, which absorbs impact energy by being axially crashed and buckled when subjected to an impact from front, rear, or side, can be exemplified by, for example in automobile members, those members as shown by shadowing in FIG. 1, specifically, a front crash box 2, a rear crash box 3, a front side member (front frame) 4, a rear side member (rear frame) 5, a front upper rail 6, a side sill (rocker) 7, and members constituting various cross members 8 and the like.

Figure 2:
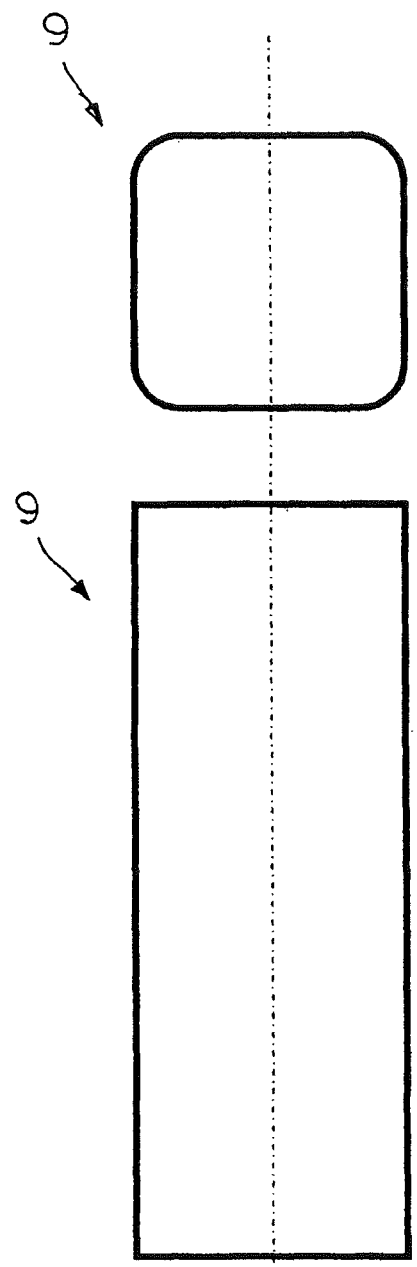
FIG. 2 is a two-view diagram to show an example of the shape of an impact absorbing portion.
Figure 3:
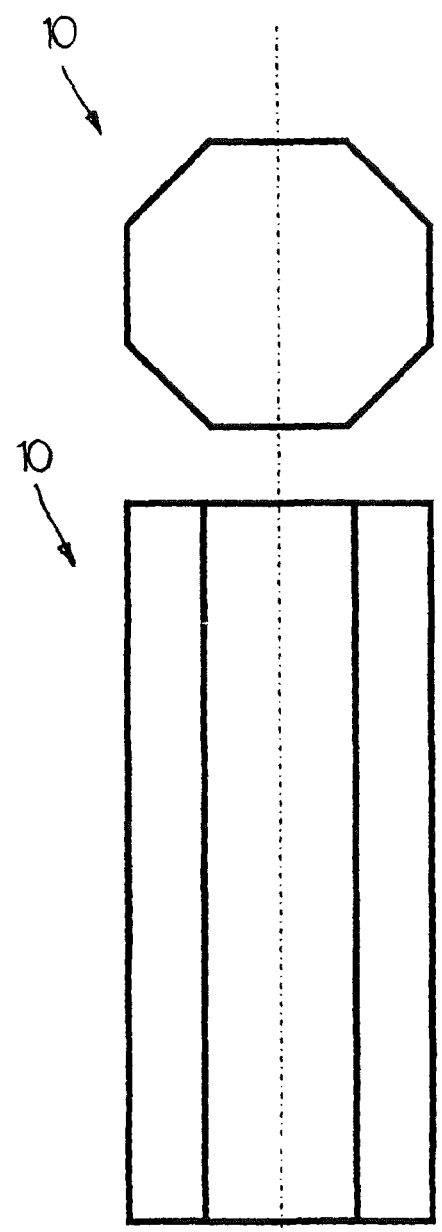
FIG. 3 is a two-view diagram to show another example of the shape of an impact absorbing portion.

FIGS. 2 and 3 are both two-view diagrams to show an example of the shape of impact absorbing portions 9 and 10.

The shape of the impact absorbing portion, for which a tubular body having a closed section is suitable, can be exemplified by tubular bodies having a closed section of a rectangular shape as shown in FIG. 2 and a closed section of an octagonal shape as shown in FIG. 3.

Although an example in which the sectional shape is constant in the axial direction is shown in each of FIGS. 2 and 3, the sectional shape is not limited thereto. The sectional shape may be continuously changed in axial direction. Moreover, although examples in which sectional shapes are a rectangular shape and an octagonal shape are shown in FIGS. 2 and 3, the sectional shape is not limited thereto. The sectional shape may be any polygonal shape. Further, it may be any shape having a closed section such as a star shape. Moreover, the corners thereof may be rounded.

Since an impact absorbing member made of the steel material according to the present invention has excellent robustness, it also has excellent impact absorption capability against impact other than in axial direction. Therefore, the steel material according to the present invention is also suitably applied to an impact absorbing portion in an impact absorbing member, in which the impact absorbing portion absorbs impact energy by being crashed in bending and plastically deformed. The impact absorbing member having the impact absorbing portion for absorbing impact energy by being crashed in bending and plastically deformed can be exemplified by the front crash box 2, the rear crash box 3, the front side member (front frame) 4, the rear side member (rear frame) 5, the front upper rail 6, the side sill (rocker) 7, various cross members 8, a bumper reinforcement 11, and members constituting various pillars such as a center pillar (B post) 12.

As well known to a person skilled in the art, some impact absorbing members absorb impact energy through either one of, or both of axial crash and bending.

4. Plating Layer

The steel material according to the present invention may be made a surface-treated steel material having a plating layer on at least one surface thereof (for example, one or both surfaces thereof when the steel material is a steel sheet) for the purpose of improving corrosion resistance, and so on. The plating layer may be an electroplating layer or a hot-dip plating layer.

The electroplating layer is exemplified by those by electro-galvanizing, Zn—Ni alloy electroplating, and the like. The hot-dip plating layer is exemplified by those by hot-dip galvanizing, alloyed hot-dip galvanizing, hot-dip Al plating, hot-dip Zn—Al alloy plating, hot-dip Zn—Al—Mg alloy plating, hot-dip Zn—Al—Mg—Si alloy plating, and the like.

The mass of deposit of plating is not particularly limited, and may be the same as prior art. Moreover, an appropriate chemical treatment (for example, application and drying of silicate-base chromium-free liquid for chemical conversion) can be applied after plating to further improve corrosion resistance.

5. Manufacturing Method

The above described steel material according to the present invention is preferably manufactured by the manufacturing method described below.

(1) Hot Rolling Condition

It is preferable to obtain hot-rolled steel sheet by performing hot rolling in such a way that a slab having the above described chemical composition is subjected to hot rolling at a total rolling reduction of at least 50% in a temperature range of at least 800° C. and at most 950° C., and thereafter the obtained steel sheet is cooled to a temperature range of at least 400° C. and at most 500° C. starting within 0.4 second after completion of hot rolling and at an average cooling rate of at least 600° C./sec, and is further cooled to a temperature range of at most 350° C. at an average cooling rate of at least 20° C./sec and less than 100° C./sec to be coiled.

First, applying hot rolling at a total rolling reduction of at least 50% in a temperature range of at least 800° C. and at most 950° C. to accumulate a large amount of work strain in austenite, and then starting the cooling within 0.4 seconds after completion of hot rolling, and at an average cooling rate of at least 600° C./sec to a temperature range of at least 400° C. and at most 500° C. makes it possible to obtain bainite structure made up of a fine lath. This cooling is hereafter also referred to as primary cooling.

After performing this primary cooling, cooling the steel sheet to a temperature range of at most 350° C. at an average cooling rate of at least 20° C./sec and less than 100° C./sec, and thereafter coiling the same makes it possible to cause the retained austenite which has not transformed to bainite to transform into martensite so that the second phase contains martensite. The cooling at this time is hereafter also referred to as secondary cooling.

The steel material according to the present invention may be a hot-rolled steel sheet manufactured as described above, or may be a cold-rolled steel sheet which is obtained by subjecting the hot-rolled steel sheet to cold rolling and continuous annealing as described below. Moreover, it may also be a plated steel sheet obtained by plating a hot-rolled steel sheet or cold-rolled steel sheet.

(2) Cold Rolling, Annealing, Hot-Dip Galvanizing

When a cold-rolled steel sheet is obtained by subjecting the above described hot-rolled steel sheet to cold rolling and continuous annealing, it is preferable that the cold rolling is performed at a rolling reduction of at least 40% and at most 90%, and the continuous annealing is performed by holding the cold-rolled steel sheet in a temperature range of at least 750° C. and at most 900° C. for at least 10 seconds and at most 150 seconds, and then cooling the obtained steel sheet to a temperature range of at most 500° C. at an average cooling rate of at least 8° C./sec. It is further preferable that the cooling in the continuous annealing is performed by cooling the steel sheet to a temperature range of at most 450° C. at an average cooling rate of at least 15° C./sec. After this cooling, a low-temperature heat treatment for holding the steel sheet at a temperature near the cooling temperature may be performed.

Performing the cold rolling at a rolling reduction of at least 40% thereby accumulating work strain, and holding the cold-rolled steel sheet in a temperature range of at least 750° C. and at most 900° C. for at least 10 seconds and at most 150 seconds and thereafter cooling it to a temperature range of at most 500° C. at an average cooling rate of at least 8° C./sec makes it possible to promote the bainite transformation, and cause the retained austenite which has not transformed to be transformed into martensite, so that the second phase contains martensite.

Thus obtained steel sheet may be further subjected to hot-dip galvanizing by immersing it in a hot-dip galvanizing bath to manufacture a hot-dip galvanized steel sheet. After being subjected to the hot-dip galvanizing, the steel sheet may be further subjected to alloying treatment to manufacture an alloyed hot-dip galvanized steel sheet. The alloying treatment is preferably at the temperature of at most 550° C.

When hot-dip galvanizing and alloying treatment are applied, it is preferable in view of productivity that a continuous hot-dip galvanizing facility is used to perform continuous annealing and hot-dip galvanizing, and in some cases, alloying treatment in one process step.

EXAMPLES

Experiments were carried out by using slabs (thickness: 35 mm, width: 160 to 250 mm, and length: 70 to 90 mm) having chemical compositions shown in Table 1. Each of the slabs was obtained by vacuum melting and casting 150 kg of molten steel, thereafter heating the obtained cast sample at an in-furnace temperature of 1250° C., and hot-forging the same at a temperature of at least 950° C.

TABLE 1

| Steel Type | Chemical Composition (Unit: mass %, the Renainder: Fe and Impurities) | | | | | | | | | |
|---|---|---|---|---|---|---|---|---|---|---|
| | C | Si | Al | Mn | P | S | N | Cr, Mo | Other Elements | Remarks |
| A | 0.12 | 0.51 | 0.034 | 2.01 | 0.001 | 0.002 | 0.0024 | Cr: 0.25 | Ti: 0.01 | Inventive Example |
| B | 0.08 | 0.50 | 0.033 | 1.49 | 0.001 | 0.005 | 0.0025 | Cr: 0.25; Mo: 0.13 | Ti: 0.02; Nb: 0.020 | Inventive Example |
| C | 0.10 | 1.25 | 0.033 | 2.18 | 0.005 | 0.002 | 0.0028 | Cr: 0.15 | — | Inventive Example |
| D | 0.12 | 0.55 | 0.032 | 2.21 | 0.003 | 0.002 | 0.0025 | Cr: 0.15 | Ti: 0.005; V: 0.005; B: 0.001 | Inventive Example |
| E | 0.15 | 1.25 | 0.050 | 2.48 | 0.008 | 0.002 | 0.0030 | — | Nb: 0.010 | Inventive Example |
| F | 0.16 | 0.51 | 0.017 | 2.01 | 0.013 | 0.002 | 0.0046 | Cr: 0.51 | Ti: 0.057; Nb: 0.008 | Comparative Example |
| G | 0.15 | 0.01 | 0.033 | 0.75 | 0.015 | 0.001 | 0.0035 | — | — | Comparative Example |
| H | 0.15 | 0.50 | 0.033 | 2.11 | 0.005 | 0.002 | 0.0025 | Cr: 0.25 | Ti: 0.01; Nb: 0.005 | Inventive Example |

After being subjected to reheating at 1250° C. for within 1 hour, each of the above described slabs was subjected to rough hot-rolling of four passes and further to finish hot-rolling of three passes by using a hot-rolling test machine, and a hot-rolled steel sheet was obtained by performing primary cooling and secondary cooling. The hot rolling conditions and cooling conditions are shown in Table 2.

TABLE 2

| Test No. | Steel Type | Rough Hot-rolling Number of passes | Rough Hot-rolling Total rolling reduction (%) | Finish Hot-rolling Number of passes | Finish Hot-rolling Rolling reduction of each pass | Finish Hot-rolling Finish rolling temperature (° C.) | Primary Cooling Average cooling rate (° C./s) | Primary Cooling Cooling completion temperature (° C.) | Primary Cooling Rolling completion to Cooling start Time (s) | Secondary Cooling Average cooling rate (° C./s) | Secondary Cooling Coiling temperature (° C.) | Hot-rolled Steel Sheet Thickness (mm) |
|---|---|---|---|---|---|---|---|---|---|---|---|---|
| 1 | A | 4 | 83 | 3 | 30%-30%-30% | 850 | >1000 | 450 | 0.1 | 70 | <350 | 1.63 |
| 2 | A | 4 | 83 | 3 | 30%-30%-30% | 850 | >1000 | 650 | 0.1 | 80 | <350 | 1.67 |
| 3 | A | 4 | 83 | 3 | 30%-30%-30% | 850 | 500 | 700 | 1.2 | 80 | 350 | 1.62 |
| 4 | B | 4 | 83 | 3 | 30%-30%-30% | 850 | >1000 | 450 | 0.1 | 80 | 350 | 3.02 |
| 5 | C | 4 | 83 | 3 | 30%-30%-30% | 850 | >1000 | 450 | 0.1 | 80 | 350 | 1.65 |
| 6 | D | 4 | 83 | 3 | 30%-30%-30% | 850 | >1000 | 450 | 0.1 | 80 | 350 | 2.99 |
| 7 | E | 4 | 83 | 3 | 30%-30%-30% | 900 | >1000 | 450 | 0.1 | 80 | 350 | 3.01 |
| 8 | F | 4 | 83 | 3 | 30%-30%-30% | 850 | >1000 | 500 | 0.1 | 80 | 350 | 2.89 |
| 9 | G | 4 | 83 | 3 | 30%-30%-30% | 850 | >1000 | 550 | 0.1 | 80 | 350 | 1.62 |
| 10 | H | 4 | 83 | 3 | 30%-30%-30% | 850 | >1000 | 660 | 0.1 | 80 | <350 | 1.65 |
| 11 | H | 4 | 83 | 3 | 30%-30%-30% | 850 | >1000 | 450 | 0.1 | 80 | 350 | 1.66 |

Some of the hot-rolled steel sheets were subjected to cold rolling, and thereafter to heat treatments under the conditions shown in Table 3 by using a continuous annealing simulator. Table 3 shows Test Nos. of hot-rolled steel sheets used, and conditions of cold rolling and heat treatment. In Table 3, the cooling rate means a cooling rate after annealing, and the reaching temperature in that cooling is the temperature shown in the column of low temperature heat treatment.

TABLE 3

| Test No. | Hot-rolled Steel Sheet (Test No. in Table 3) | Steel Type | Cold Rolling Reduction (%) | Annealing Temperature (° C.) | Annealing Time (sec) | Cooling Rate (° C./sec) | Low Temperature Heat Treatment Temperature (° C.) | Time (sec) | Steel Sheet Thickness (mm) |
|---|---|---|---|---|---|---|---|---|---|
| 12 | 4 | B | 47 | 800 | 120 | 20 | 400~450 | 120 | 1.65 |
| 13 | 6 | D | 47 | 800 | 120 | 20 | 380~400 | 120 | 1.62 |
| 14 | 7 | E | 47 | 850 | 120 | 20 | 400~450 | 120 | 1.66 |
| <u>15</u> | <u>8</u> | <u>F</u> | 48 | 850 | 120 | 20 | 400~450 | 120 | 1.58 |

Each of hot-rolled steel sheets and cold-rolled steel sheets thus obtained was subjected to the following investigations. The test results are summarized in Table 4. In the above described Tables, underlined numerals or symbols indicate that they are out of the range specified in the present invention.

Tension Test

Tension test was carried out by sampling a JIS 5 tensile test sample from steel sheet to determine yield strength (YS: 0.2% proof stress), tensile strength (TS), 5% flow stress, and uniform elongation (u-El).

Hole Expanding Test:

To eliminate the effect of end surface damage, reamer processing was performed for a machined hole, and a hole expanding test was carried out otherwise according to Japan Iron and Steel Federation Standard JFS T 1001-1996 to determine a hole expansion ratio.

Steel Structure:

EBSD analysis was carried out on a portion at a depth of ¼ sheet thickness of a section in parallel with the rolling direction of the steel sheet to obtain a grain boundary face orientation difference map and an image quality map. These maps were used to determine the area fraction of bainite made up of a lath structure having an average interval of at most 1 μm, and the area fraction of martensite.

Nano Hardness

Nano hardness of bainite and martensite was determined by a nanoindentation method. A portion at a depth of ¼ sheet thickness in a cross section of steel sheet in parallel with the rolling direction was polished with emery paper, and thereafter mechanochemically polished with colloidal silica, and further the affected layer was removed by electrolytic polishing to be subjected to testing. The nanoindentation method was carried out by using a Berkovich type indenter at an indentation load of 500 μN. The size of indentation in this method was at most 0.1 μm in diameter. Measurements were made at randomly selected 20 points for each phase of bainite and martensite to determine an average nano hardness for each. Moreover, average nano hardness of bainite and martensite for steel sheets after 10% tensile deformation was determined by the above described method.

Impact Absorption Performance (1) Axial Crash Test

Steel sheets to be tested were used to fabricate a rectangular tubular member, and an axial crash test in which the collision speed in the axial direction was 64 km/h was carried out to evaluate collision absorbing performance. The section of the rectangular tubular member perpendicular to the axial direction was a regular octagonal shape, and the axial direction length of the rectangular tubular member was 200 mm.

On the above described rectangular tubular members, a relationship between a sectional shape factor (Wp/t), which was defined by using the length (Wp) of one side (the length of a straight portion excepting the curved portions of corner portions) of the above described regular octagon and the sheet thickness (t) of steel sheet, and a impact absorption energy index ($E_{pa}$) and a crack occurrence rate.

Here, the impact absorption energy index ($E_{pa}$) is a parameter, which is obtained by determining an average stress applied to the above described rectangular tubular member upon buckling and normalizing it by the tensile strength of steel sheet, and is defined by the following Formula (3).

[Expression 1]

$$E_{pa} = [\text{Load } F_{ave}/(L \cdot t)]/\sqrt{TS} \quad (3)$$

Where, Load $F_{ave}$ is the average load applied to the member, L is the circumference of the above described regular polygon, and t is the thickness of steel sheet.

A stable buckling ratio is a proportion of the number of test samples in which no cracking occurred in the axial crash test with respect to the total number of samples.

In general, as the sectional shape factor (Wp/t) decreases, the absorption of impact energy improves. However, as the sectional shape factor (Wp/t) decreases, the amount of plastic deformation work per unit crash amount increases. For that reason, cracking becomes more likely to occur in the course of crash, and there may be a case in which consequently the amount of work by plastic deformation cannot be increased, and therefore the absorption of impact energy cannot be improved.

(2) Bending Crash Test

Using some of the steel sheets, a hat-type member was fabricated by arc-welding steel sheet formed into a hat shape with a flat steel sheet. This member was subjected to a bending crash test, in which the collision speed was 64 km/h in a direction perpendicular to the axial direction of the member, to evaluate the collision absorbing performance. The results are shown by the absorbed energy and the occurrence or non-occurrence of cracking at the time of bending crash.

TABLE 4

| Test No. | Type | Steel Structures[1] | Fine Bainite[2] Area fraction (%) | Martensite Area fraction (%) | $H_{M0}/H_{B0}$ | $(H_{M10}/H_{M0})/(H_{B10}/H_{B0})$ | Tensile Properties YS (MPa) | TS (MPa) | 5% Flow stress (MPa) | u-El (%) |
|---|---|---|---|---|---|---|---|---|---|---|
| 1 | Hot- | B + M | 80 | 20 | 1.41 | 1.21 | 744 | 1051 | 1044 | 9.1 |
| 2 | rolled | α + M | — | 45 | — | — | 512 | 963 | 666 | 12.9 |
| 3 | steel | α + M | — | 55 | — | — | 496 | 1053 | 548 | 11.7 |
| 4 | sheet | B + M | 80 | 18 | 1.28 | 1.18 | 703 | 958 | 978 | 10.5 |
| 5 |  | B + M | 85 | 15 | 1.37 | 1.25 | 712 | 988 | 991 | 7.7 |
| 8 |  | B + M | 65 | 30 | 1.60 | 0.85 | 653 | 1012 | 862 | 12.2 |
| 9 |  | α + M | — | 25 | — | — | 489 | 781 | 665 | 10.2 |
| 10 |  | α + M | — | 35 | — | — | 689 | 887 | 855 | 12.1 |
| 11 |  | B + M | 75 | 25 | 1.33 | 1.02 | 699 | 1001 | 954 | 11.9 |
| 12 | Cold- | B + M | 80 | 18 | 1.47 | 0.98 | 735 | 998 | 939 | 11.2 |
| 13 | rolled | B + M | 75 | 23 | 1.52 | 1.05 | 769 | 1013 | 989 | 11.5 |
| 14 | steel | B + M | 72 | 28 | 1.55 | 0.95 | 801 | 1223 | 1185 | 8.5 |
| 15 | sheet | B + M + α | 18 | 55 | 2.48 | 0.75 | 680 | 1040 | 948 | 10.8 |

| Test No. | Hole Expansion Ratio (%) | Average Crash Load during Axial Crash (kN/mm$^2$) Wp/t = 20 | Wp/t = 16 | Stable Buckling Rate during Axial Crash (%) Wp/t = 20 | Wp/t = 16 | Absorbed Energy during Bending Crash (kJ) | Crack Sensitivity[3] during Bending Crash |
|---|---|---|---|---|---|---|---|
| 1 | 103 | 0.35 | 0.38 | 100 | 66 | 2.2 | ○ |
| 2 | 45.3 | 0.28 | 0.31 | 100 | 100 | — | — |
| 3 | 38.2 | 0.25 | 0.28 | 66 | — | — | — |
| 4 | 90.5 | 0.35 | — | 100 | — | — | — |
| 5 | 108 | 0.34 | — | 100 | — | — | — |
| 8 | 40.1 | 0.33 | — | 33 | 0 | — | — |
| 9 | 75.5 | 0.28 | — | 100 | — | — | — |
| 10 | 56.2 | 0.31 | — | 100 | — | — | — |
| 11 | 66.3 | 0.34 | 0.38 | 100 | 66 | — | — |
| 12 | 71.2 | 0.34 | — | 100 | — | — | — |
| 13 | 60.6 | 0.34 | 0.37 | 100 | 33 | 1.97 | ○ |
| 14 | 61.8 | 0.39 | — | 80 | — | — | — |
| 15 | 40.5 | 0.33 | — | 25 | 0 | 1.95 | X |

Figure 4:
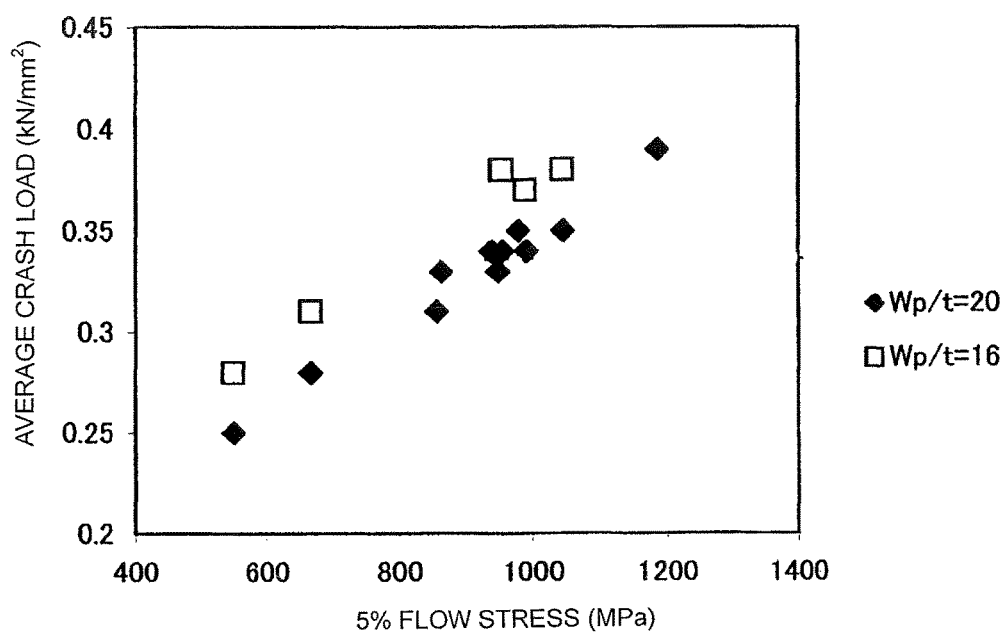
FIG. 4 is a graph to show the relationship between average crash load and 5% flow stress in an axial crash test.
Figure 5:
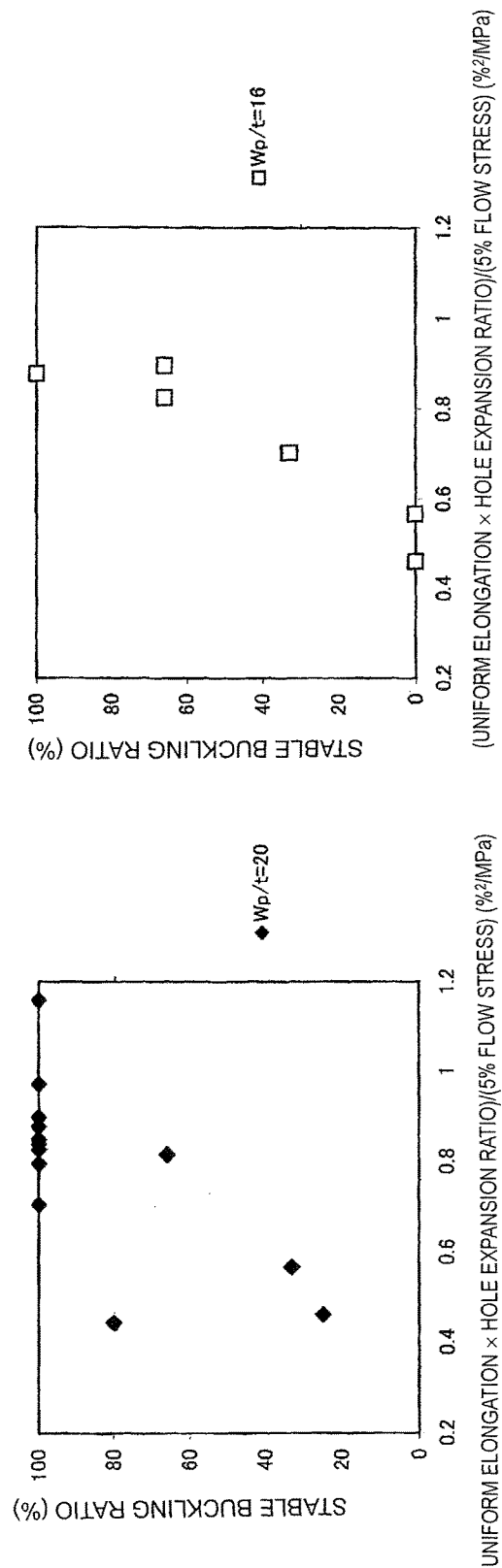
FIG. 5 is graphs to show relationships between stable buckling ratio, and 5% flow stress, uniform elongation, and hole expansion ratio in the axial crash test.

[1]B: Bainite, M: Martensite, α: Ferrite,
[2]Fine Bainite: Bainite made up of a lath structure having an average lath spacing of not more than 1 μm
[3]○: Non-occurrence of crack, X: Occurrence of cracking FIG. 4 is a graph showing the relationship between the average crash load and the 5% flow stress in two deferent sectional shape factors (Wp/t=20, 16) for Test Nos. 1 to 15. Moreover, FIG. 5 is graphs showing the relationship among stable buckling ratio, 5% flow stress, uniform elongation, and hole expansion ratio for each sectional shape factor.

Figure 6:
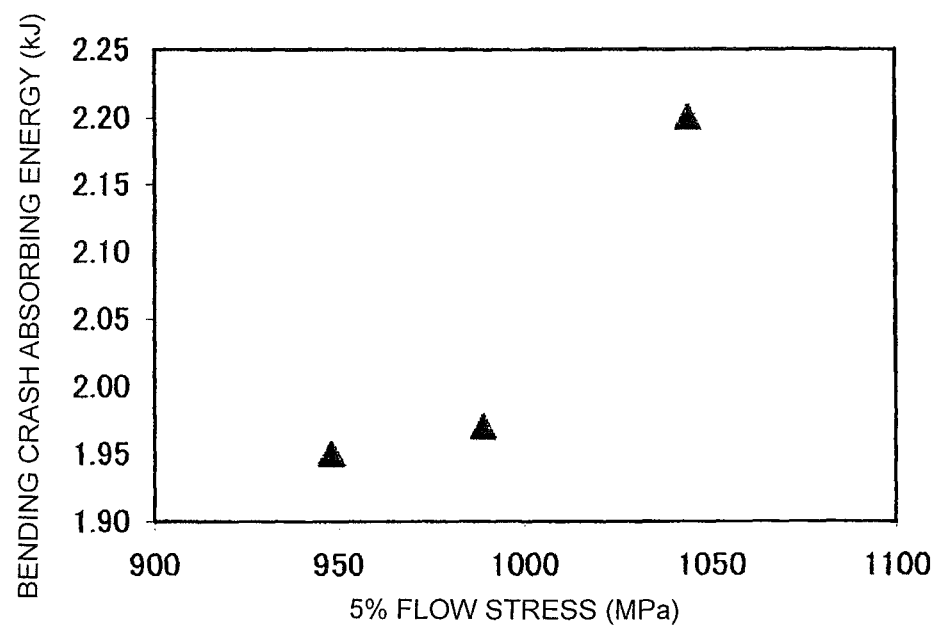
FIG. 6 is a graph to show the relationship between absorption of impact energy and 5% flow stress in a bending crash test.

FIG. 6 is a graph showing the relationship between the absorption of impact energy and the 5% flow stress in the bending crash test.

As seen from Table 4, the steel materials according to the present invention exhibited a 5% flow stress of as high as at least 900 MPa, and an average load of as high as at least 0.34 kN/mm$^2$ during axial crash in the axial crash test when a sectional shape factor Wp/t=20. Moreover, they showed excellent impact absorbing performance in axial crash in that the stable buckling ratio was at least 80% when a sectional shape factor Wp/t=20, and at least 30% when a sectional shape factor Wp/t=16.

In Comparative Examples, the axial crash load and the stable buckling ratio are not satisfied concurrently, and the axial crash load and/or the stable buckling ratio was low.

Further, it can be concluded that the steel materials according to the present invention were excellent in robustness in that they exhibited good impact absorbing performance not only in axial crash but also in bending crash.

It can be seen from FIG. 4 that as the 5% flow stress increases, the average crash load (impact absorbing performance) in the axial crash test increases. It can be seen from FIG. 5 that there is a correlation between the stable buckling ratio, and the 5% flow stress, the uniform elongation, and the hole expansion ratio in the axial crash test, and that as the value of [(uniform elongation×hole expansion ratio)/5% flow stress] increases, the stable buckling ratio increases. Further, it can be seen from FIG. 6 that as the 5% flow stress increases, the bending crash absorbing energy increases, and thereby the impact absorbing performance is improved.

The invention claimed is:
1. A steel material, comprising:
a chemical composition containing: by mass %, C: at least 0.05% and at most 0.18%, Mn: at least 1% to at most 3%, Si+Al: at least 0.5% and less than 2.5%, and N: at least 0.001% and at most 0.015%, Cr: 0 to 0.5%, Mo: 0 to 0.2%, Ti: 0 to 0.05%, Nb: 0 to 0.05%, V: 0 to 0.2%, and B: 0 to 0.002%, the remainder being Fe and impurities; and
a steel structure containing: by area %, bainite made up of a lath structure having an average interval of at most 1 μm: at least 70%, and martensite: 5% to 30%, the steel structure satisfying the following Formulas (1) and (2):

$$1.2 \leq H_{M0}/H_{B0} \leq 1.6 \tag{1}$$

$$0.90 \leq \{(H_{M10}/H_{M0})/(H_{B10}/H_{B0}) \leq 1.3 \tag{2}$$

wherein $H_{M0}$ represents initial average nano hardness of the martensite, $H_{B0}$ represents initial average nano hardness of the bainite, $H_{M10}$ represents average nano hardness of the martensite after 10% tensile deformation, and $H_{B10}$ represents average nano hardness of the bainite after 10% tensile deformation.

2. The steel material set forth in claim 1, wherein the chemical composition, by mass %, contains one or two selected from the group consisting of Cr: 0.1 to 0.5% and Mo: 0.1 to 0.2%.

3. The steel material set forth in claim 1, wherein the chemical composition, by mass %, contains one or more selected from the group consisting of Ti: 0.002 to 0.05%, Nb: 0.002 to 0.05%, and V: 0.002 to 0.2%.

4. The steel material set forth in claim 1, wherein the chemical composition contains, by mass %, B: 0.0001 to 0.002%.

5. The steel material set forth in claim 1, wherein at least one surface has a plated layer.

6. An impact absorbing member, comprising an impact absorbing portion for absorbing impact energy by being axially crashed and buckled, wherein the impact absorbing portion is made of the steel material set forth in claim 1.

7. An impact absorbing member, comprising an impact absorbing portion for absorbing impact energy by being crashed in bending and plastically deformed, wherein the impact absorbing portion is made of the steel material set forth in claim 1.

* * * * *